Patented Oct. 18, 1927.

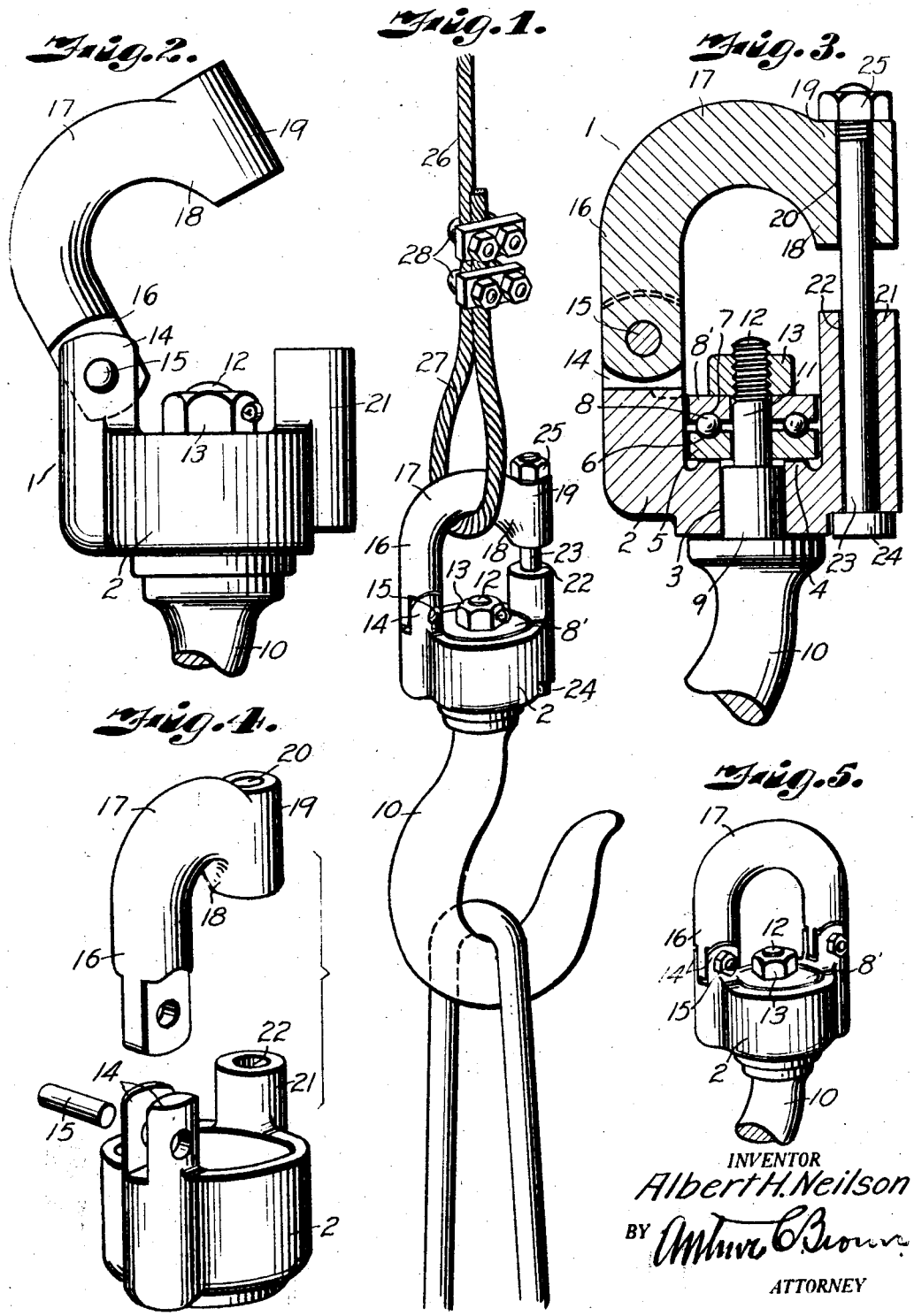

1,645,714

UNITED STATES PATENT OFFICE.

ALBERT H. NEILSON, OF TULSA, OKLAHOMA.

CLEVIS.

Application filed October 30, 1926. Serial No. 145,357.

My invention relates to clevises and more particularly to a device of that character for use in connection with oil well derricks or the like, for suspending heavy loads from a hoisting cable, the principal object of the invention being to provide a clevis of this character which may be opened to receive the cable loop and closed to confine the loop and thereby prevent accidental disconnection of the cable and clevis, and provide for quick and easy application of the cable to the clevis without the necessity for unclamping the cable loop when the changes are to be made.

In accomplishing this object I have provided improved details of structure, the preferred forms of which are illustrated in the accompanying drawings, wherein:

Fig. 1 is a perspective view of a clevis embodying my improvements, illustrating application of the hoisting cable thereto.

Fig. 2 is an enlarged side elevation of the device showing the clevis bail in open position.

Fig. 3 is an enlarged longitudinal section of the device showing the bail closed and illustrating the keeper member.

Fig. 4 is a detail perspective view of the parts of the clevis in separated relation.

Fig. 5 is a detail perspective view of a modified form of the structure.

Referring more in detail to the drawings:

1 designates the clevis as a whole, comprising a cup shaped base 2 having a central aperture 3 surrounded by a flange 4, seating a plate 5 having an upwardly facing ball race 6 cooperating with a downwardly facing race 7 in a plate 8; the plates 5 and 8 fitting loosely within the base cup and the upper plate lying on balls that are located in the cooperating ball races 6 and 7, and provide an anti-friction support for a suspended member.

Rotatable in the aperture 3 is the shank 9 of a hook 10 and extending from the shank is a pintle 11 rotatably mounting the ball race plates and having a threaded end 12 carrying a nut 13 whereby the plates are retained on their flange seat.

Extending upwardly from the base 2 is a standard, comprising spaced ears 14 carrying a pin 15 between and upon which is pivotally mounted the leg 16 of the bail 17, the opposite leg 18 of which constitutes a barrel 19 having the longitudinal channel 20. The leg 18 is shorter than the leg 16 and terminates in spaced relation to the end of a barrel 21 integral with the base 2 and constituting a standard on the base opposite the standard formed by the spaced ears 14.

The barrel 21 has a channel 22 registering with the channel 20 in the bail barrel 19 when the bail is closed and extended through the channels in the two members of the clevis is a bolt 23 having a head 24 bearing against the bottom of the barrel 21 on the base member and a nut 25 bearing against the top of the barrel 19 of the bail member.

26 designates a hoisting cable having a loop 27 at its lower end formed by turning back the end of the cable and attaching the overlapping strands by U-bolts 28.

With the clevis constructed as described the bail may be disconnected from the base and swung about on its pivot to permit application of the cable loop. When the cable loop is in place the bolt 23 is applied to the base and bail members to connect the free leg of the bail with the base standard and close the clevis to prevent escape of the cable loop.

With the parts assembled as described, the clevis may be used for its ordinary purposes without danger of disconnection from the cable under the rough usage to which such equipment is subjected.

When, however, it is desired to replace the clevis with another tool the bail may be quickly unlocked from the base member and swung about its pivot to permit removal from the cable loop.

It is apparent that with this construction the clevis may be applied to the cable without the delay incident to unclamping of the cable loop and that the connection is secure in that the loop may be firmly set in its formed condition and that the bolted connection of the clevis bail with its base will securely confine the cable when the parts are assembled.

In the modified form shown in Fig. 5 the clevis bail is U-shaped with the legs of the same length and both pivotally connected with their base so that either may be swung free to admit the cable loop.

What I claim and desire to secure by Letters Patent is:

1. In combination with a cupped base, ball races in the base cup, a shank rotatable in said base, means supporting the shank on the ball races, a bail member having one arm pivotally mounted on the base for hingedly mounting the bail member, and means removably anchoring the other arm of the bail to the base to confine a draft member.

2. A clevis of the character described comprising, in combination with a base member having opposite standards, one constituting a pivot mounting and the other a barrel, a bail member comprising an arm having hinged connection with said pivot mounting and an opposite arm having a barrel portion adapted for registration with the base barrel, and a pin removably located in said barrels to lock the bail to the base and confine a draft element.

3. In a clevis of the character described, a base comprising opposite standards, one constituting a pivot mounting and the other a barrel, a bail having a long arm hinged to said pivot mounting and a short arm constituting a barrel registerable with the barrel on said base, and a bolt extending through said barrels to lock the bail to the base and confine a draft element.

4. In a clevis, a base member comprising spaced arms, a bail member comprising spaced arms, the bail being inverted relative to the base, relative arms of the base and bail having hinged connection, and means removably connecting the other arms of the base and bail.

5. In a clevis, a base member comprising spaced arms, a bail member comprising spaced arms, the bail being inverted relative to the base, relative arms of the base and bail having hinged connection, and a bolt connecting the other arms of the base and bail.

In testimony whereof I affix my signature.

ALBERT H. NEILSON.